(12) United States Patent
Takenaka

(10) Patent No.: US 7,233,454 B2
(45) Date of Patent: Jun. 19, 2007

(54) FLOPPY DISK CONTROL CIRCUIT AND FLOPPY DISK APPARATUS

(75) Inventor: Seiji Takenaka, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 11/075,787

(22) Filed: Mar. 9, 2005

(65) Prior Publication Data

US 2005/0200999 A1 Sep. 15, 2005

(30) Foreign Application Priority Data

Mar. 11, 2004 (JP) ............................. 2004-69158

(51) Int. Cl.
*G11B 15/46* (2006.01)
*H02P 5/00* (2006.01)

(52) U.S. Cl. ..................... 360/73.03; 318/66

(58) Field of Classification Search ............... None
See application file for complete search history.

(56) References Cited

U.S. PATENT DOCUMENTS

| | | | |
|---|---|---|---|
| 4,604,663 A * | 8/1986 | Moribe et al. | 360/73.03 |
| 4,656,533 A * | 4/1987 | Sakai et al. | 360/65 |
| 5,412,809 A * | 5/1995 | Tam et al. | 713/324 |
| 5,953,176 A * | 9/1999 | Shimazu et al. | 360/73.03 |
| 6,243,222 B1 * | 6/2001 | Boutaghou et al. | 360/73.03 |
| 6,301,070 B1 * | 10/2001 | Sakaguchi | 360/73.03 |
| 6,304,405 B1 * | 10/2001 | Asano et al. | 360/73.03 |
| 2002/0030917 A1 * | 3/2002 | Haitani | 360/71 |

FOREIGN PATENT DOCUMENTS

| | | |
|---|---|---|
| JP | 06-119708 A | 4/1994 |
| JP | 11-306501 | 11/1999 |
| JP | 2000-311422 | 11/2000 |
| JP | 2001-93224 A | 4/2001 |
| JP | 2002-074810 | 3/2002 |

OTHER PUBLICATIONS

Official Communication Issued in corresponding Japanese Patent Application No. 2004-069158, dated Jun. 27, 2006.

* cited by examiner

*Primary Examiner*—Andrew L. Sniezek
(74) *Attorney, Agent, or Firm*—Keating & Bennett, LLP

(57) ABSTRACT

A floppy disk control circuit enables a floppy disk apparatus to operate at high speed while current consumption is suppressed to no more than 500 mA, i.e. the maximum allowed current of an apparatus using a USB interface. The floppy disk control circuit outputs a reference clock to a spindle motor drive circuit that drives the spindle motor in accordance with the reference clock to rotate a floppy disk. The floppy disk control circuit outputs a slow reference clock for a low rotational speed corresponding to the maximum allowed current at the commencement of the start-up of rotation of the floppy disk and outputs a fast reference clock for a high rotational speed after lapse of a predetermined time from the commencement of the start-up of rotation.

20 Claims, 4 Drawing Sheets

FLOPPY DISK CONTROL CIRCUIT AND FLOPPY DISK APPARATUS

BACKGROUND OF THE INVENTION

1. Field of the Invention

The present invention relates to a floppy disk control circuit that controls a spindle motor drive circuit that drives a spindle motor to rotate a floppy disk and a floppy disk apparatus having such a floppy disk control circuit.

2. Description of the Related Art

In recent years, floppy disk apparatus that use a USB (Universal Serial Bus) interface instead of the conventional legacy interface as the interface with a host apparatus, such as a personal computer, have become available as commercial products. Such known floppy disk apparatuses are disclosed in for example Laid-open Japanese Patent Application No. H. 11-306501, Laid-open Japanese Patent Application No. 2000-311422 and Laid-open Japanese Patent Application No. 2002-74810. The basic configuration of such known floppy disk apparatuses is as shown in FIG. 4. Specifically, such a floppy disk apparatus 1 includes an interface control circuit 10 that communicates with the host apparatus 2 through a USB, a floppy disk control circuit 11 that receives control data or write data from the interface control circuit 10 or sends read data to the interface control circuit 10 and that controls a spindle motor drive circuit 12, a stepping motor drive circuit 14 and a read/write circuit 16 (described subsequently), a spindle motor drive circuit 12 that is controlled by the floppy disk control circuit 11, a spindle motor 13 that is driven by the spindle motor drive circuit 12 so as to rotate the floppy disk, a stepping motor drive circuit 14 that is controlled by the floppy disk control circuit 11, a stepping motor 15 that shifts a magnetic head 17 (described subsequently), driven by the stepping motor drive circuit 14, a read/write circuit 16 that performs input/output of read and write data with the floppy disk control circuit 11 and performs input/output of electrical signals with respect to a magnetic head 17, and a magnetic head 17 that converts magnetic signals on the floppy disk to electrical signals or converts electrical signals to magnetic signals.

Recently, space-saving and/or cost-reduction are performed by using a semiconductor integrated circuit (hereinbelow referred to as a three-in-one chip) 9 that integrates the three main circuits of the floppy disk control circuit 11, stepping motor drive circuit 14 and read/write circuit 16. This three-in-one chip 9 is a custom product which must be customized for each customer with respect to, for example, the transfer rate of the read/write circuit 16. In contrast, a standard semiconductor integrated circuit is typically used for the spindle motor drive circuit 12.

With commercialization of such USB interface floppy disk apparatuses, it has become possible to increase the read/write speed of floppy disks, which was restricted by the legacy interface.

However, the standard for an apparatus using a USB interface restricts the maximum allowed current to no more than 500 mA. Specifically, if the current value exceeds this, source current may not be supplied from, for example, the host apparatus 2 because the host apparatus 2 regards such an apparatus as unsuitable. In the development of a three-in-one chip for controlling a standard spindle motor drive circuit for application to a floppy disk apparatus capable of reading/writing with double or quadruple speed, the inventor of the present application recognized that this maximum allowed current posed a problem during the start-up of rotation of the floppy disk. More specifically, when the floppy disk of such a double or quadruple speed floppy disk apparatus is rotated at a steady speed, the current consumption is below the maximum allowed current. However, the inventor found that, since the spindle motor requires a large torque during start-up of rotation, as shown in FIG. 5, this current consumption $I_{CC}$ exceeds the maximum allowed current and in fact increases to the vicinity of 1A. The character $t_0$, which has a value of, for example, 500 mS) in FIG. 5 is the time at which read/write operation and other operations of the floppy disk apparatus actually commence.

SUMMARY OF THE INVENTION

In order to overcome the problems described above, preferred embodiments of the present invention provide a floppy disk control circuit that enables a floppy disk apparatus to operate at double or quadruple speed while current consumption is suppressed to no more than the prescribed maximum allowed current.

According to a preferred embodiment of the present invention, a floppy disk control circuit outputs a reference clock to a spindle-motor drive circuit that drives a spindle motor in accordance with the reference clock to rotate a floppy disk, wherein a slow reference clock for low-speed rotation corresponding to the maximum allowed current is output at the commencement of the start-up of rotation of the floppy disk and a fast reference clock for high-speed rotation is output after the lapse of a predetermined time from the commencement of the start-up of rotation.

Preferably, in this floppy disk control circuit, high-speed rotation is a rotation of double or quadruple speed.

According to another preferred embodiment of the present invention, a floppy disk apparatus includes the floppy disk control circuit as described above, a spindle motor drive circuit into which the reference clock is input from the floppy disk control circuit, and a spindle motor that is driven to rotate a floppy disk by the spindle motor drive circuit.

A floppy disk control circuit according to this preferred embodiment of the present invention outputs a slow reference clock for a low rotational speed corresponding to the maximum allowed current at the commencement of the start-up of rotation of the floppy disk and outputs a fast reference clock for a high rotational speed after the lapse of a predetermined time from the commencement of the start-up of rotation, so the current consumption of the floppy disk apparatus can be maintained below the maximum allowed current.

Other elements, characteristics, features, properties, and advantages of the present invention will become clearer from the detailed description of the preferred embodiments of the present invention that is to be described next with reference to the attached drawings.

DETAILED DESCRIPTION OF PREFERRED EMBODIMENTS

Figure 1:
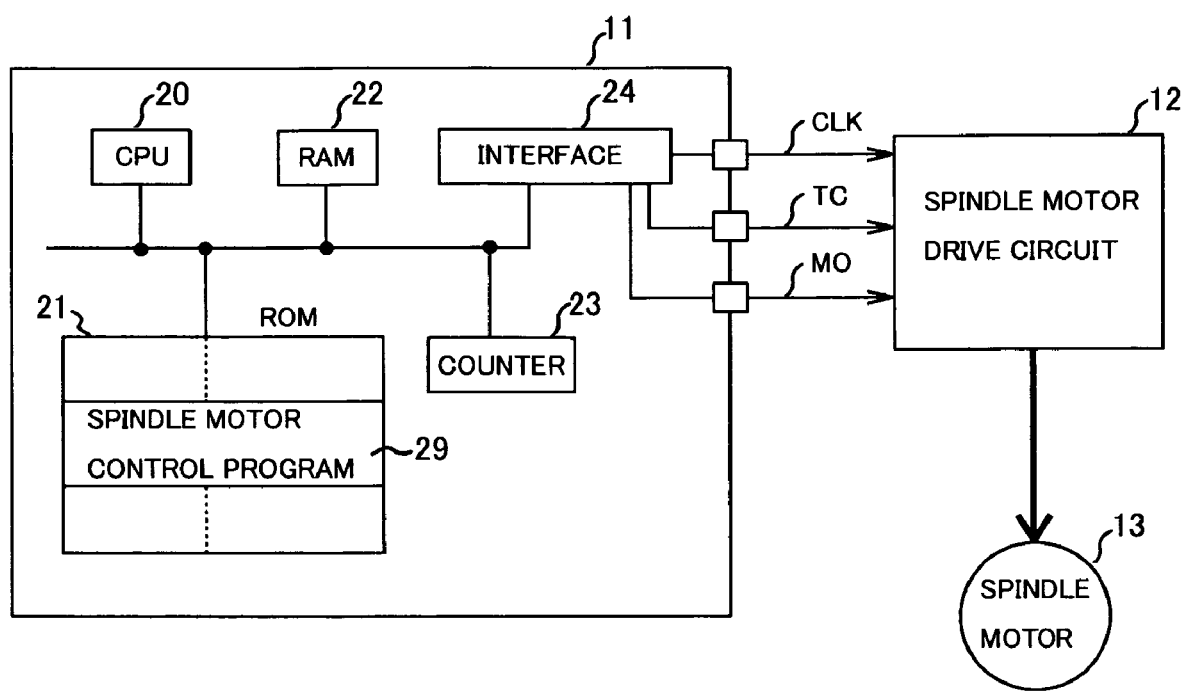
FIG. 1 is a block diagram of a floppy disk control circuit according to a preferred embodiment of the present invention.

A floppy disk control circuit and a floppy disk apparatus including the floppy disk control circuit according to preferred embodiments of the present invention will be described herein below. FIG. 1 shows a floppy disk control circuit 11 of a preferred embodiment of the present invention. In FIG. 1, the portions relating to the interface control circuit 10, stepping motor drive circuit 14 and read/write circuit 16 are not shown. A floppy disk apparatus of a preferred embodiment of the present invention is similar to the floppy disk apparatus 1 shown in FIG. 4 and includes the floppy disk control circuit 11 described below.

The floppy disk control circuit 11 controls a spindle motor drive circuit 12 by outputting a reference clock CLK, media type indication signal TC, and motor on/off signal MO. The reference clock CLK is a clock that is output in accordance with a spindle motor control program (described later). The media type indication signal TC is a signal for reporting whether the type of the mounted floppy disk is the 2 MB type or the 1.6 MB type and for producing operation of the spindle motor drive circuit 12 in accordance therewith. Also, the motor on/off signal MO is a signal that provides instructions for operation/non-operation thereof. When the motor on/off signal MO is on, the spindle motor drive circuit 12 drives the spindle motor 13 in accordance with the reference clock CLK to rotate the floppy disk. In order to perform high-speed rotation of the floppy disk with double speed (for example, 600 rpm in the case of a 2 MB media or 720 rpm in the case of a 1.6 MB media) or quadruple speed (for example, 1200 rpm in the case of a 2 MB media or 1440 rpm in the case of a 1.6 MB media), the frequency of the reference clock CLK that is output by the floppy disk control circuit 11 is twice or four times the frequency at the low-speed rotation, i.e. "single speed" (for example, 300 rpm in the case of a 2 MB media or 360 rpm in the case of a 1.6 MB media).

Figure 2:
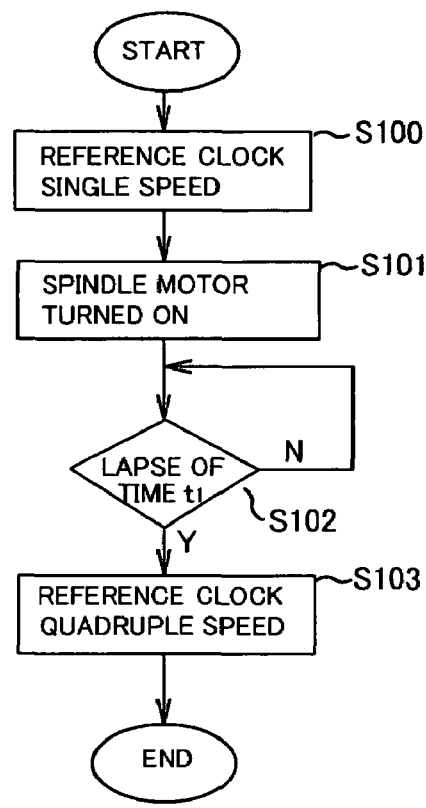
FIG. 2 is a flow chart of a spindle motor control program thereof.

The floppy disk control circuit 11 preferably includes, for example, a microcomputer having, for example, a CPU 20, ROM 21, RAM 22, counter 23 and interface 24. The interface 24 is connected with terminals that output the reference clock CLK, media type indication signal TC and motor on/off signal MO. Control of the spindle motor drive circuit 12 by these signals is performed by the CPU 20 in accordance with a spindle motor control program 29 stored in the ROM 21. By this spindle motor control program 29, the floppy disk control circuit 11 outputs a slow reference clock CLK for a low rotational speed corresponding to the maximum allowed current at the commencement of the start-up of rotation of the floppy disk and outputs a fast reference clock CLK for a high rotational speed after the lapse of a predetermined time $t_1$ (for example, about 300 mS) from the commencement of the start-up of rotation. An example of the flow of the spindle motor control program 29 is shown in FIG. 2. Specifically, when a read/write instruction of the floppy disk is received from the interface control circuit 10, first of all a slow reference clock CLK is output (S100) corresponding to low rotational speed, for example, single speed. Next, when the motor on/off signal is turned on (S101), the program waits for the passage of a predetermined time $t_1$, by using the counter 23, for example (S102). After lapse of the predetermined time $t_1$, a fast reference clock CLK corresponding to, for example, quadruple speed is output (S103). This predetermined time $t_1$ is set to a time in the vicinity of the time at which the large peak current (described later) has passed.

Figure 3:
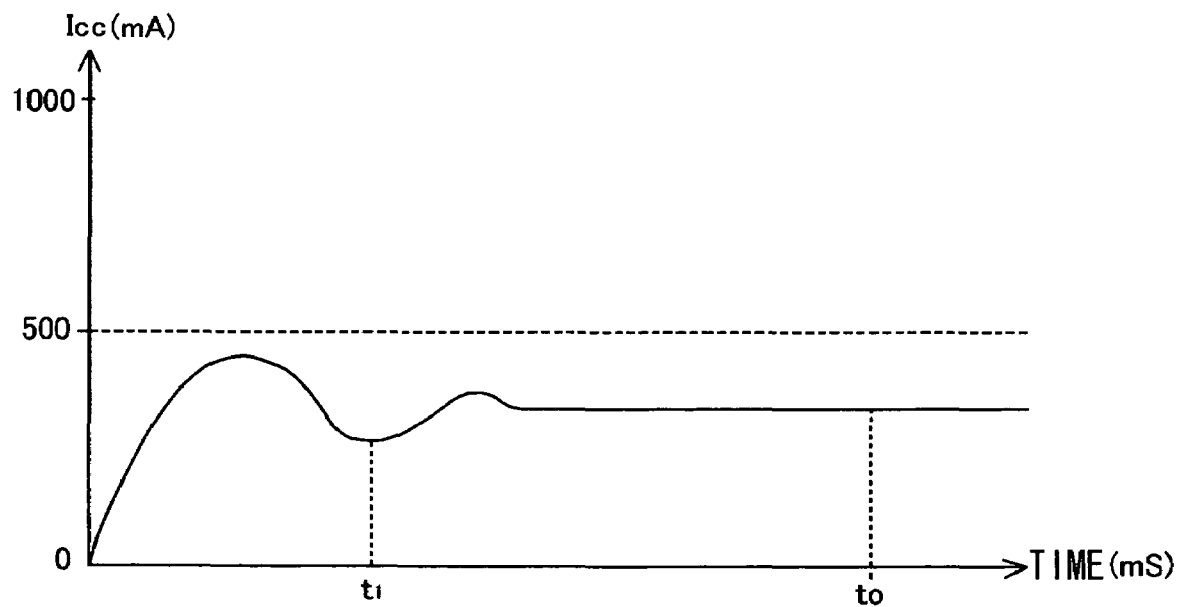
FIG. 3 is a current consumption waveform diagram of a floppy disk apparatus according to a preferred embodiment of the present invention.

The current consumption $I_{CC}$ of the floppy disk apparatus 1 is changed as shown in FIG. 3 by this spindle motor control program 29. Specifically, although a large peak current flows from the commencement of the start-up of rotation of the floppy disk until the predetermined time $t_1$, the current consumption $I_{CC}$ does not reach the maximum allowed current, i.e. 500 mA. A small peak current flows for a short while after the lapse of the predetermined time $t_1$ and, thereafter, become stable by the time $t_0$ (for example, 500 mS) at which the floppy disk apparatus 1 commences read/write operation.

It should be noted that the low-speed rotation at the commencement of the start-up of rotation of the floppy disk is a speed corresponding to the maximum allowed current. That is, if the scale of the circuitry of the floppy disk apparatus 1 is large, it is possible that the peak current might exceed the maximum allowed current even if the low-speed rotation is single speed, so, in this case, it is arranged for a reference clock CLK to be output that is of a speed that is further lowered, corresponding to about 0.5 speed.

Figure 4:
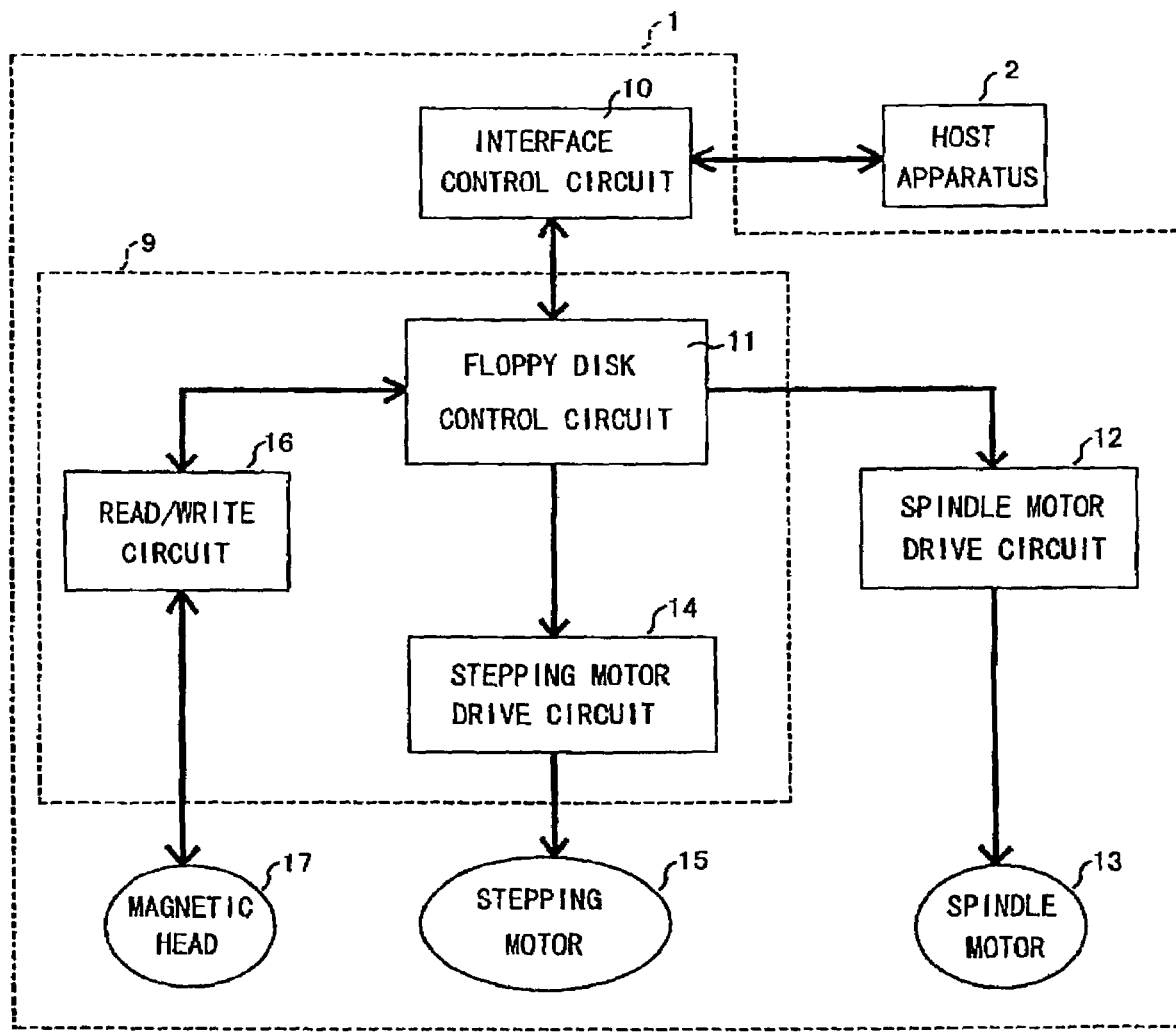
FIG. 4 is an overall block diagram of a floppy disk apparatus according to a preferred embodiment of the present invention or a prior art.
Figure 5:
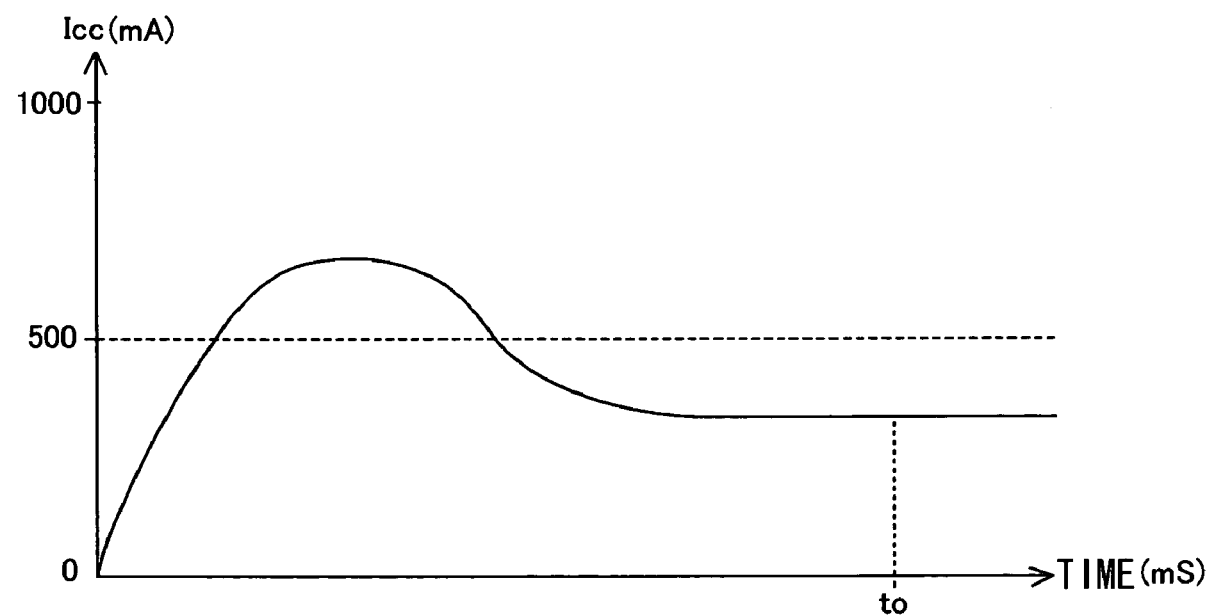
FIG. 5 is a current consumption waveform diagram of a floppy disk apparatus according to a prior art.

Thus, the floppy disk control circuit 11 makes it possible that the current consumption of the floppy disk apparatus 1 can be kept to no more than the maximum allowed current. Therefore, the floppy disk control circuit 11 is suitable for the floppy disk apparatus 1, as shown in FIG. 4, using a USB interface.

The control of the spindle motor drive circuit 12 could of course be achieved using a special-purpose logic circuit and counter or other suitable circuit, instead of a control program stored in ROM.

Also, although the spindle motor drive circuit 12 is a standard semiconductor integrated circuit controlled by a reference clock CLK, media type indication signal TC and motor on/off signal MO, a standard semiconductor integrated circuit that is controlled solely by a reference clock CLK is also available as a commercial product. Since in this semiconductor integrated circuit the spindle motor 13 is also driven in accordance with the period of the reference clock CLK, the current can be kept below the maximum allowed current by controlling the reference clock CLK in the same way as in the case where this circuit is used.

It should be noted that the present invention is not restricted to the preferred embodiments described above and various alterations in design could be made within the scope of the patent claims.

What is claimed is:

1. A floppy disk control circuit that outputs a reference clock to a spindle motor drive circuit that drives a spindle motor in accordance with the reference clock to rotate a floppy disk, wherein a slow reference clock for low-speed rotation corresponding to a maximum allowed current is output at a commencement of a start-up rotation of the floppy disk, and, so that a peak current consumption of the spindle motor is kept to no more than the maximum allowed current, a fast reference clock for high-speed rotation is output after the peak current consumption of the spindle motor has passed.

2. The floppy disk control circuit according to claim 1, wherein said high-speed rotation is double speed or quadruple speed rotation.

3. The floppy disk control circuit according to claim 1, wherein said low-speed rotation is single speed rotation.

4. The floppy disk control circuit according to claim 2, wherein said low-speed rotation is single speed rotation.

5. The floppy disk control circuit according to claim 1, wherein a media type indication signal for reporting a type of the floppy disk and a motor on/off signal that provides instructions for operation/non-operation are also output by the floppy disk control circuit.

6. The floppy disk control circuit according to claim 1, wherein the floppy disk control circuit comprises a spindle motor control program.

7. The floppy disk control circuit according to claim 1, wherein the floppy disk control circuit includes a microcomputer including a CPU, a ROM, a RAM, a counter and an interface.

8. The floppy disk control circuit according to claim 7, wherein the CPU controls the spindle motor drive circuit by executing a spindle motor control program stored in the ROM.

9. A floppy disk apparatus, comprising:
a floppy disk control circuit that outputs a reference clock to a spindle motor drive circuit that drives a spindle motor in accordance with the reference clock to rotate a floppy disk, wherein a slow reference clock for low-speed rotation corresponding to a maximum allowed current is output at a commencement of a start-un rotation of the floppy disk, and, so that a peak current consumption of the spindle motor is kept to no more than the maximum allowed current, a fast reference clock for high-speed rotation is output after the peak current consumption of the spindle motor has passed;
the spindle motor drive circuit to which the reference clock is input from the floppy disk control circuit; and
the spindle motor that is driven by the spindle motor drive circuit so as to rotate the floppy disk.

10. The floppy disk apparatus according to claim 9, further comprising an interface control circuit that performs communication through a USB.

11. The floppy disk apparatus according to claim 9, further comprising:
a stepping motor drive circuit controlled by the floppy disk control circuit; and
a read/write circuit that performs input/output of read and write data with the floppy disk control circuit.

12. The floppy disk apparatus according to claim 11, wherein the floppy disk control circuit, the stepping motor drive circuit and the read/write circuit are integrated in a semiconductor integrated circuit.

13. The floppy disk apparatus according to claim 9, wherein the floppy disk control circuit includes a microcomputer including a CPU, a ROM, a RAM, a counter and an interface.

14. The floppy disk apparatus according to claim 9, wherein the floppy disk control circuit comprises a special-purpose logic circuit and a counter.

15. A floppy disk apparatus according to claim 9, wherein said high-speed rotation is double speed or quadruple speed rotation.

16. The floppy disk apparatus according to claim 15, further comprising an interface control circuit that performs communication through a USB.

17. The floppy disk apparatus according to claim 15, further comprising:
a stepping motor drive circuit controlled by the floppy disk control circuit; and
a read/write circuit that performs input/output of read and write data with the floppy disk control circuit.

18. The floppy disk apparatus according to claim 17, wherein the floppy disk control circuit, the stepping motor drive circuit and the read/write circuit are integrated in a semiconductor integrated circuit.

19. The floppy disk apparatus according to claim 15, wherein the floppy disk control circuit includes a microcomputer including a CPU, a ROM, a RAM, a counter and an interface.

20. The floppy disk apparatus according to claim 15, wherein the floppy disk control circuit comprises a special-purpose logic circuit and a counter.

* * * * *